Aug. 9, 1966   C. BREBANT   3,264,741
DIMENSIONAL INSPECTION BENCH FOR PARTS
HAVING CYLINDRICAL BODIES
Filed April 17, 1963   2 Sheets-Sheet 2

3,264,741
DIMENSIONAL INSPECTION BENCH FOR
PARTS HAVING CYLINDRICAL BODIES
Charles Brebant, Aix-en-Provence, France, assignor to
Commissariat a l'Energie Atomique, Paris, France
Filed Apr. 17, 1963, Ser. No. 273,693
Claims priority, application France, Apr. 27, 1962
895,936
3 Claims. (Cl. 33—172)

The present invention relates to a dimensional inspection bench for parts having cylindrical bodies, and especially for nuclear reactor fuel elements.

It is known that the fuel elements at present employed in power reactors are in most cases constituted by a cylindrical rod of fissile material enclosed in a can which is provided externally with fins of various shapes, the fin channel roots being customarily designed so that the envelope surface thereof is a cylinder of revolution. It is also known that it is frequently necessary to record the deformations or variations of the fuel elements as compared with their initial theoretical shape, after inpile operation. For this purpose, recourse is at present had to photography and radiography. However, the accuracy of such methods does not exceed a few tenths of a millimeter, which is not sufficient.

The present invention is concerned with a measuring bench which provides the possibility of checking the dimensions of parts having preferably a circular cross-section with a precision of a few hundredths of a millimeter and which additionally satisfies the following conditions in order to be applicable to the checking of fuel elements in totally enclosed test cells:

The ability to measure profiles of rods (having variable diameters and lengths) at the fin channel bases along a generator-line which can have any shape (as a rule either straight or helical);

The possibility of calibration or re-calibration by remote control;

The ability to withstand inevitable shocks at the time of displacements of heavy fuel elements by means of a remote handling device;

A design which permits of easy disassembly for decontamination operations, although these latter are as a rule limited since the bench is not necessarily located in a cell for machining fuel elements.

To this end, the dimensional inspection bench in accordance with the invention, which is intended for the checking of variations between a real generator-line and a theoretical generator-line of a part having a cylindrical body and especially of a nuclear reactor fuel element, comprises a rotary support for the cylindrical part and a measuring head, said measuring head and said support being movable relatively to each other parallel to the axis of rotation of said support and is characterized in that the measuring head is composed of a frame which supports on the one hand a first moving system which is mounted to rotate about a first shaft carried by said frame and located in a plane passing through the theoretical generator-line of said body, and on the other hand a second moving system which is mounted to rotate about a second shaft carried by said first moving system and oriented at right angles to said first shaft in a same plane, a detector element being carried by said second moving system for the purpose of following the real generator-line to be checked, and means being provided for the purpose of measuring the angular deviations of said moving systems with respect to reference positions defined by the theoretical generator-line.

The invention also consists in a certain number of other arrangements which are preferably employed in conjunction with the previous arrangement but which can also be employed independently. The invention will in any case be more clearly understood from a perusal of the description which follows below, reference being made therein to the accompanying drawings which show by way of example and not in any sense by way of limitation one form of practical application of the invention.

Figure 1:
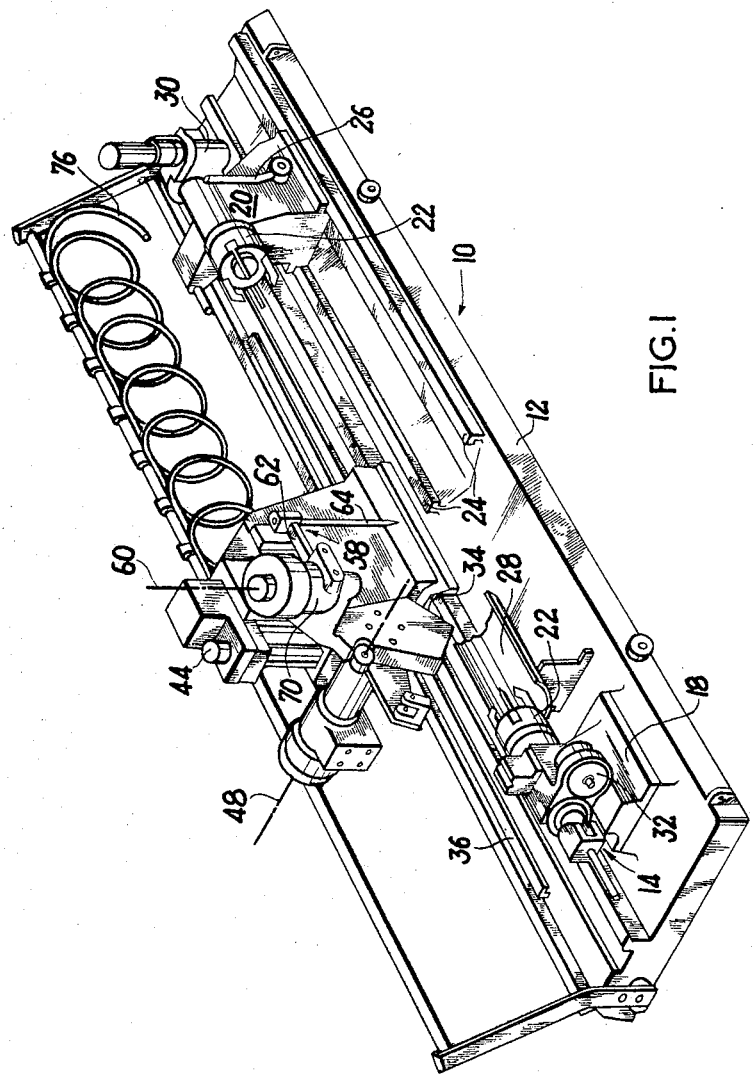
FIG. 1 is a general perspective view of a bench for the measurement of nuclear reactor fuel rods.
Figure 2:
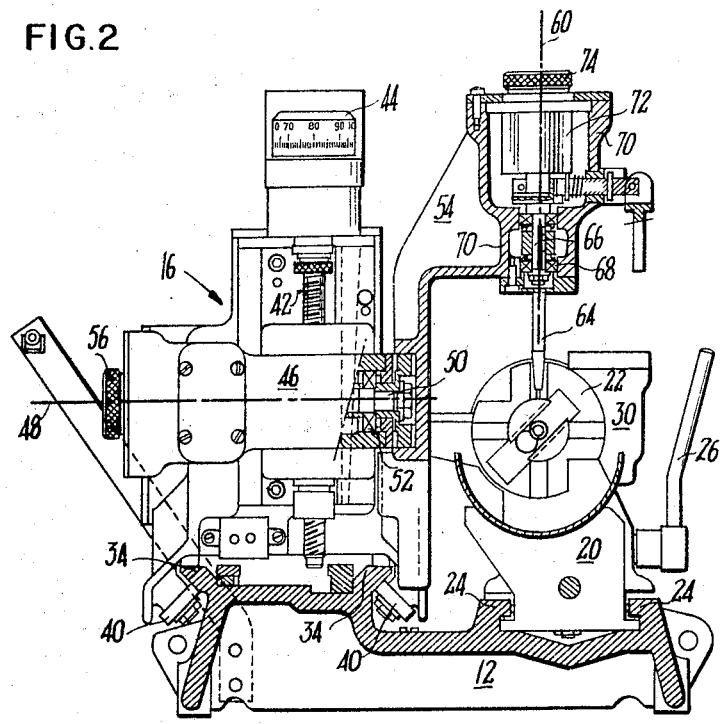
FIG. 2 is a partial transverse sectional view taken along the axes of rotation of the moving systems looking on the left end.

The measuring bench 10 which is represented in FIG. 1 and FIG. 2 comprises, on a stationary frame 12, a workpiece holder assembly 14 and a measuring head 16. The workpiece holder assembly comprises a headstock 18 and a tailstock 20, the said headstock and tailstock being each fitted with a three-jaw clamping chuck 22. The workpiece or nuclear fuel rod (which has not been illustrated in the drawings) can thus be clamped between the jaws and the axis of rotation of said workpiece or fuel rod coincides with the axis of rotation of the chucks. The tailstock 20 is capable of displacement along slideways 24 for the purpose of adjusting the position thereof in dependence on the length of the workpiece to be inspected, and can then be locked in position by means of any conventional mechanism operated by means of a lever 26. A trough 28 facilitates the positioning of the workpiece by means of a manipulator or any other suitable handling device. Either the headstock or tailstock (for example the tailstock in the figure) is equipped with a motor 30 which causes the rotation of the tailstock chuck 22; the headstock is fitted with a rotation recorder 32.

The measuring head 16 is carried by slideways 34 (as shown in FIG. 2) which are parallel to the axis of rotation of the chucks 22. The translational movement of the measuring head is controlled by a mechanism of conventional type, for example by means of a pinion which engages with a stationary rack 36 (as shown in FIG. 1). Since the speed of rotation of the chucks can also be regulated, it can be seen that the points of the workpiece to be inspected, which are aligned along a generator-line of any shape and especially of helicoidal shape, can be caused to move past beneath the measuring head.

The constructional arrangement of the measuring head 16 is shown in greater detail in FIG. 2. The head is fitted with a carriage comprising guide rollers 40 which run on roller tracks 34. The said carriage is built in the form of a measuring unit which can be pre-set for height by means of a screw and nut control 42 operated by means of a knob 44 provided with a micrometric scale which serves to predetermine with precision the position of the unit with respect to the axis of rotation of the chucks 22.

The measuring unit comprises a sleeve 46, the axis 48 of which is perpendicular to the axis of rotation of the chucks 22. (In the form of embodiment which is illustrated in the drawings, the axis 48 is horizontal.) A shaft 50 is coupled to the sleeve 46 by means of roller bearings 52 which permit only the rotation of said shaft about the axis 48.

The shaft 50 carries a first moving system 54, the angular displacements of which with respect to a home position are measured by a detector mechanism (which has not been shown in the drawings). The said detector mechanism can advantageously be constituted by a goniometer which is coupled to a similar instrument designed to actuate an indicator or recording system. The shaft 50 terminates in a knurled knob 56 which serves to rotate the moving system either manually or by means of the manipulator which has been mentioned above. In addition, the moving system 54 is designed so that the detector element is applied with very light pressure against the workpiece to be verified, as will be seen below.

A second moving system 58 (as shown in FIG. 1) is mounted to rotate on the first moving system about an axis 60 which intersects the axis 48 at right angles. The moving system 58 is constituted by an arm 62 which carries at one end a freely mounted contact needle or feeler 64 and at the other end a shaft 66 supported on roller bearings 68 which are mounted inside a sleeve 70 rigidly secured to the moving system 54. The angular displacements of the moving system 58 (relatively to a home position in which the plane of the axis 60 and the point of contact of the needle 64 with the workpiece to be checked is perpendicular to the plane of the axes 48 and 60) are measured by means of a detector mechanism 72 which is similar to the detector mechanism employed for the first moving system. The shaft 66 terminates in a knurled operating knob 74 similar to the knob 56. A flexible cable 76 (as shown in FIG. 1) having a number of supply leads transmits to the receivers the signals which are emitted by the detecting goniometers and supplies current to the motor which in turn produces the longitudinal displacement of the measuring head.

The longitudinal displacements of the head are transmitted to an indicator device or recording instrument by means of a system of electromagnetic transmitters of the selsyn type, said transmitters being driven by a roller, which can be one of the guide rollers 40, and which is adapted to run on a rule. In order to ensure the requisite precision of 0.01 mm., two selsyns are provided, one of which effects the measurement in hundredths of a millimeter once per revolution of the roller while the other selsyn counts the revolutions of the first selsyn in order to give a measurement in millimeters.

Figure 3:
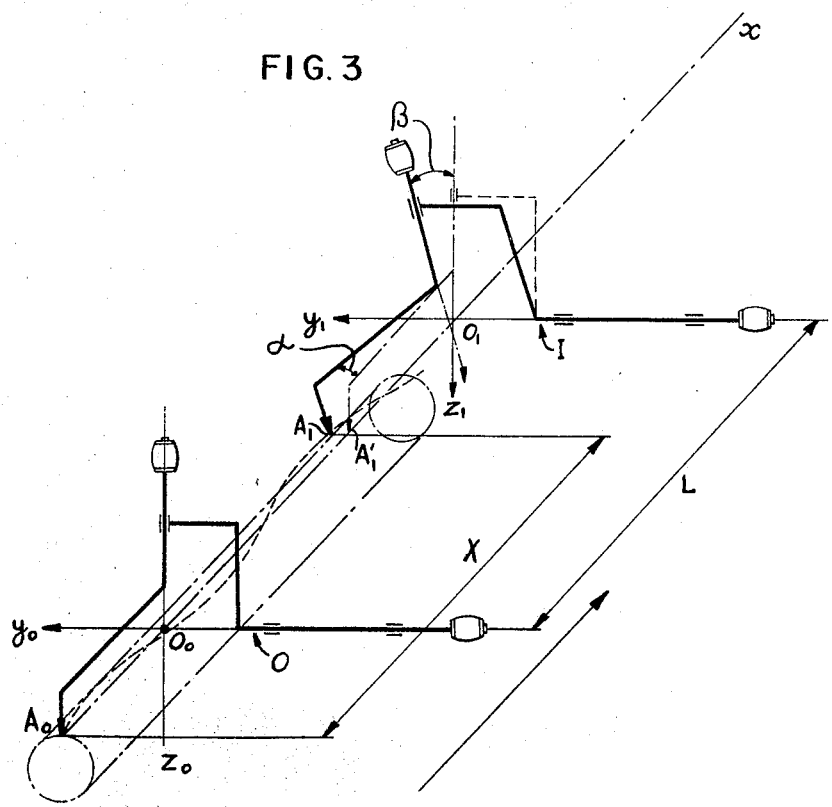
FIG. 3 is a diagrammatic perspective view which illustrates the operation of the bench.

The operation of the bench will now be described below, reference being made especially to FIG. 3, which shows diagrammatically the measuring head in a starting position O in which the detector element 64 constituted by the freely mounted contact needle is in contact with the point $A_0$ of a workpiece or rod, and in a work position I, the contact needle 64 being in that case on a point $A_1$ of the rod; the indications in chain-dotted lines give the theoretical shape of the rod to be inspected while the indications in broken lines give the real shape of the generator-line as deformed with respect to its theoretical shape (that is to say the shape of the generator-line of the right circular cylinder representing the rod) which is thus assumed to be rectilineal.

The displacement of the measuring head takes place from $O_0$ to $O_1$ along the longitudinal axis which is considered as the $x$-axis and accordingly moves the contact needle in this direction. The $y$- and $z$-axes are then defined with respect to the $x$-axis in two directions respectively at right angles. Starting from the position nearest the tailstock 20, the measurement of the displacement of the measuring head is transmitted to a recorder, the reading of which gives the coordinate L (as shown in FIG. 3) of the point $O_1$, from which the abscissa X of the point $A_1$ can be deduced as measured with respect to $A_0$. The corrections for transition from L to X can be disregarded in the case of the current values of deformations of rods, but should it be found necessary, the transition from L to X can be effected by means of graphs in the manner which will be explained below.

When the feeler needle 64 is in contact with the point $A_1$ of the rod, said needle is thus in a position which is different from the position which it would have at the point $A'_1$ corresponding to the theoretical generator-line. The first moving system 54 has rotated through an angle $\beta$ with respect to its normal position. The second moving system 58 has rotated through an angle $\alpha$. The tangential deviation Y and the radial deviation Z of the point $A_1$ with respect to the point $A'_1$ can be deduced from the angles $\alpha$ and $\beta$, the length $O_0A_0$ being known. This in fact gives the relation:

$$Y = O_0A_0 \cdot \sin \beta$$

$$Z = O_0A_0 \cdot \sin \alpha \cdot \cos \beta$$

The deviations Y and Z can be deduced from the values, for example, of $\alpha$ and $\beta$ as measured or recorded by the goniometers, directly by the use of appropriate tables. It is useful to note that the appearance of the angle $\beta$ in the relation which gives Z is due to the fact that the angle $\alpha$ is not the true angle of deviation of $O_1A_1$ in the plane $z_1O_1A_1$ but only the angle of the plane $y_1O_1A_1$ with respect to the plane $y_1O_1A'_1$. On the contrary, the angle $\beta$ is the true angle of deviation of $O_1A_1$ in the plane $y_1O_1A_1$. The correction to be made in the measured abscissa L in order to deduce therefrom the real abscissa X is accordingly given by a formula which employs the length $O_1A_1$ and the angles of deviation $\alpha$ and $\beta$. This correction, which results from the fact that the point of the feeler needle passes along a portion of a sphere which is centered on the point O and not a plane which is perpendicular to the axis of the abscissae, is provided by means of nomographs, but remains negligible in the majority of cases.

The rotation of the rod, which is necessary for the purpose of taking a measurement reading of a helical profile, for example, is recorded by a potentiometer, whereas the measuring head can be adjusted for height by means of the micrometric screw 42, the reading being taken on the drum 44. Before this measurement is effected, the micrometric screw permits the plane $xOy$ to be brought as near as possible to the plane of the mean generator-line of the rod which is taken as the theoretical generator-line. In order to check a fin channel root profile in a nuclear fuel can, the feeler 64 can be advantageously constituted by a needle fitted with a removable ball 65. The said removable ball is adapted to run along the can body and remains applied with light pressure against the bases of the fin channels by virtue of the action of a balancing member such as a counterweight, for example.

When the checking is carried out on a cylindrical rod which is not provided with fins (non-canned fuel element, for example), the feeler contact can be replaced by a roller having an axis at right angles to that of the chucks, while the second moving system is locked in its position of zero deviation. Similarly, the device can be employed as a thickness-measurement comparator by locking the second moving system and by placing a fixed horizontal plate between the chucks.

By substituting optical devices for electric recorders, a precision of the order of one thousandth of a millimeter can be obtained. Such a degree of precision is not necessary for the purpose of checking fuel rods, however, and does not in this case justify the attendant increase both in complexity and price, although it remains evident that such an alternative form could prove useful in other applications.

What I claim is:

1. Dimensional inspection bench for measuring and checking the variations between a real generator-line and a theoretical generator-line of a part having a cylindrical body, said bench comprising a rotary support including a headstock and a tailstock for said part and a measuring head, said head and said support being movable relatively to each other parallel to the axis of rotation of said support along the length of said part, characterized in that the measuring head is composed of a frame which supports on the one hand a first moving system which is mounted to rotate about a first shaft carried by said frame and located in a plane passing through the theoretical generator-line of said body, and on the other hand a second moving system which is mounted to rotate about a second shaft carried by said first moving system and oriented at right angles to said first shaft in a same plane, a detector element being carried by said second moving system for the purpose of following the real generator-line by contact with said part, and means being provided for the purpose of measuring the angular deviations of said moving systems with respect to reference positions defined by the theoretical generator-line.

2. Dimensional inspection bench in accodrance with claim 1, characterized in that the reference positions of said moving systems are defined by the positions of said first and second shafts in which the plane containing said shafts is at right angles to the axis of rotation of said support and to the plane containing said second shaft and the point of contact of said detector element with the cylindrical part.

3. Dimensional inspection bench in accordance with claim 1, characterized in that the measuring head comprises a height-adjustment system constituted by a screw and nut control which can be operated by means of a knob provided with a micrometric scale so as to predetermine the position of said measuring head with respect to the axis of rotation of said support.

References Cited by the Examiner
UNITED STATES PATENTS

| | | | |
|---|---|---|---|
| 842,144 | 1/1907 | Gee | 33—80 |
| 1,445,482 | 2/1923 | Bull | 33—172 |
| 1,485,247 | 2/1924 | Carlson | 33—172 |
| 1,546,423 | 7/1925 | Williams | 33—174 |
| 1,910,467 | 5/1933 | Heckersdorf et al. | 33—167 |
| 2,166,212 | 7/1939 | Hayward | 33—134.5 |
| 2,770,798 | 11/1956 | Roth | 340—206 |
| 2,845,710 | 8/1958 | Claret et al. | 33—1 |
| 2,952,077 | 9/1960 | Burgess et al. | 33—170 |
| 3,007,637 | 11/1961 | Meirwitz | 235—103 |

LOUIS R. PRINCE, *Primary Examiner.*

ISAAC LISANN, *Examiner.*

D. McGIEHAN, *Assistant Examiner.*